(No Model.)
L. E. HOFFMAN.
BACK PEDALING BRAKE.
No. 606,217. Patented June 28, 1898.
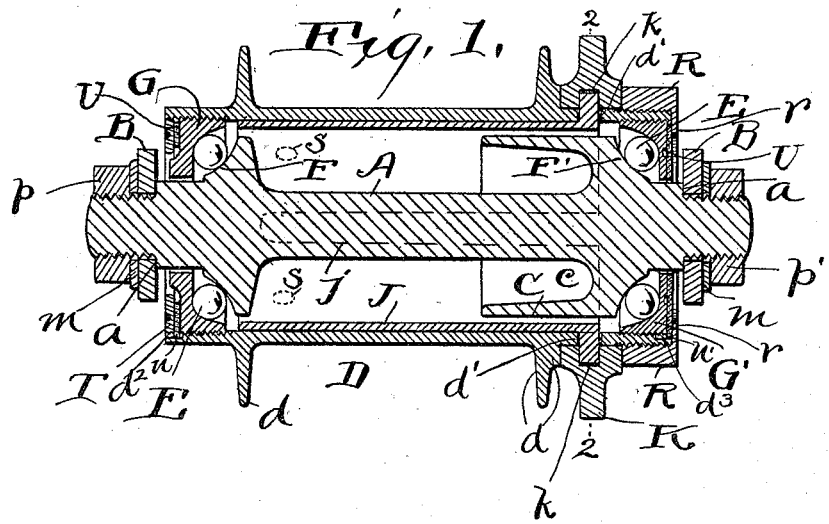
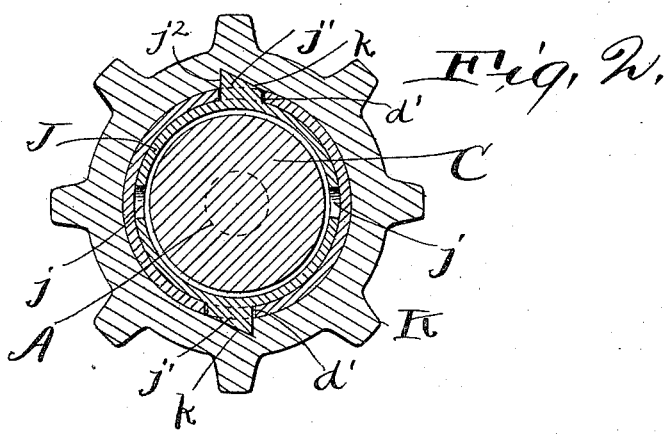
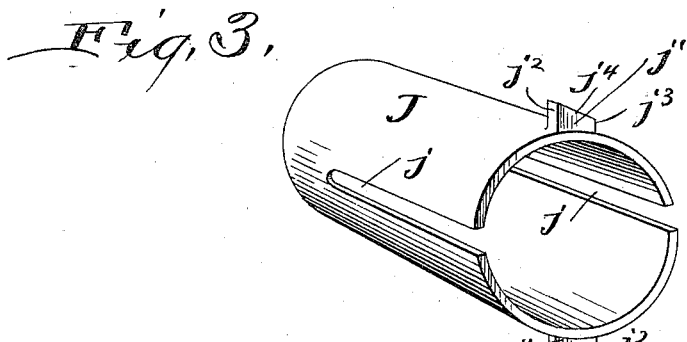
Witnesses.
E. B. Gilchrist
A. M. Hutchison.
Inventor.
Louis E. Hoffman,
By his Attorneys,
Thurston & Bates.

UNITED STATES PATENT OFFICE.

LOUIS E. HOFFMAN, OF CLEVELAND, OHIO.

BACK-PEDALING BRAKE.

SPECIFICATION forming part of Letters Patent No. 606,217, dated June 28, 1898.

Application filed October 15, 1897. Serial No. 655,277. (No model.)

*To all whom it may concern:*

Be it known that I, LOUIS E. HOFFMAN, a citizen of the United States, residing at Cleveland, in the county of Cuyahoga and State of Ohio, have invented certain new and useful Improvements in Bicycle-Brakes; and I do hereby declare the following to be a full, clear, and exact description of the invention, such as will enable others skilled in the art to which it appertains to make and use the same.

My invention is for a brake adapted to be located at the hub of the rear or driving wheel of a bicycle or similar vehicle and be operated by restraining the driving power by back-pedaling.

The object of the invention is to supply such a brake which shall be cheap in construction, durable, and efficient and very compact and neat in appearance.

The invention consists, broadly, of a sprocket or other driving wheel, a hub, and a stationary braking member, combined with a split sleeve within the hub and revolving with it and surrounding such stationary member, and a cam connection between the driving-wheel and the sleeve, such that when the wheel is driving the hub the split sleeve will be revolved circularly and out of engagement with the stationary member, but when the driving power is being restrained and a relative movement between the sprocket-wheel and hub results the cam connection will move the split sleeve inward, so as to contact with the stationary braking member.

The invention consists, more specifically, in the combination of a stationary axle carrying a stationary braking-surface, a wheel-hub loosely turning on such axle and surrounding the braking-surface, a split sleeve within the hub surrounding the braking-surface and having lugs projecting through the hub, and a sprocket-wheel which when revolved in a forward direction carries said split sleeve around out of contact with said stationary member, but on being moved backward forces said lugs inward, causing the sleeve to contact with said stationary member.

The invention also consists in certain novel parts and combinations hereinafter specified, and definitely enumerated in the claims.

The drawings show the best embodiment of my invention at present known to me.

Figure 1 is a vertical central longitudinal section through the hub of a bicycle-wheel having my improved brake. Fig. 2 is a transverse section of the same, being taken on the line 2 2 of Fig. 1. Fig. 3 is a perspective view of the split sleeve.

The same letters of reference designate the same parts in the several figures.

Referring to the parts by letters, A represents the axle of the driven wheel of a bicycle or similar vehicle. This axle is rigidly secured to the rear forks of the frame, shown in section at B B, by any desired means, that shown in the drawings being shoulders $a$, integral with the axle, nuts $p$ $p'$, and washers $m$.

The hub of the bicycle-wheel is designated by D. It loosely surrounds the axle, and is supported thereby through the intervention of balls E, which roll between cones F F' upon the axle and cups G G' on the hub. These cones I prefer to make integral with the axle, as shown, though they may be screwed or forced on, if desired. Adjustability I prefer to give to the bearings by the cups G G', which screw into the interior of the hub, and are securely locked, respectively, by the jam-nut T and the flange $r$, extending inwardly from the nut R, which screws onto the outside of the hub, though other means for supporting the hub or adjusting the bearing may be employed, if desired. It will thus be seen that the hub is supported by the axle upon suitably-adjustable ball-bearings and is otherwise out of contact therewith. Flanges $d$, projecting from the hub, or other expedients provide means for attachment of the spokes of the wheel.

The parts so far described form an ordinary bicycle construction and are set forth specifically only as illustrative.

Surrounding the axle between the cones F and F' is the boss C, which forms the stationary braking member. This boss is made of some suitable material rigidly secured to the axle. It is preferably made and located as shown, being integral with the axle and the cone F' and being hollowed at $c$ for lightness.

J represents a sleeve, preferably made of steel, split by means of one or more slots $j$, and having projecting from it near the split end lugs $j'$. I prefer to ordinarily provide one lug for each forked portion of the sleeve, wherefore the lugs may be said to equal the slots in number, though the proportion might be different.

The sleeve J fits snugly inside of the hub D, and the lugs $j'$ project through holes or slots $d'$ in the hub, whereby the sleeve is compelled to rotate with the hub. Surrounding the hub at the points where the lugs $j'$ project into it is the sprocket or other driving wheel K. This sprocket-wheel is prevented from shifting laterally on the hub by suitable means, that shown in the drawings being the spoke-flange $d$ on one side and the screw collar or nut R on the other. Recesses $k$ are formed in the sprocket-wheel, and into these the lugs $j'$ project. The outer or bottom surface of this recess is cam-shaped, by which I mean that it occupies other than a right angle to a radial line. Wherefore it results that when the sprocket-wheel is shifted with respect to the sleeve J the lug $j'$ is forced inward. The cam-surface referred to is in such direction that this forcing inward of the lug takes place when the sprocket-wheel is turned backward. The rear edge of the lug projects upward in a substantial radial direction, as at $j^2$, so that when the sprocket-wheel is turned forward the lug will not be forced inward by it, but will be caused to revolve with it. I prefer to make the lug in the ratchet-faced form shown in the drawings, wherein its forward side $j^3$ rises from the cylindrical surface of the sleeve a distance about equal to the thickness of the hub, while its rear side $j^2$ rises about twice that distance, and the top side $j^4$ is a substantially plain surface, and I prefer to make the recess $k$ to conform to that portion of the lug exposed outside of the hub, though it will be readily understood that the lug or recess might be made of different shape from that shown, the essential being that the rear edge of the lug shall lock the sprocket-wheel against forward rotation, while a reverse movement of the wheel will force the lug inward the desired distance.

When the lugs $j'$ have been forced inward some distance by the backward movement of the sprocket-wheel, the split sleeve J contacts with the stationary braking member C and causes a braking action. The more force that is applied to turn the wheel backward—that is, the harder the rider back-pedals—the more tightly will the split sleeve clasp the stationary member and the greater will be the braking action. The extent to which the highest point of the lug $j'$ projects into the recess $k$ is somewhat greater than the distance between the split sleeve and the stationary braking member. Wherefore it results that before the cam-surface $k$ has passed beyond the lug the split sleeve will have contacted with the stationary member and the sprocket-wheel will not be able to turn backward far enough for its cam-surface to become free of the lug. It will thus be seen that the engagement between the sprocket-wheel and lug is a limited ratchet and that the movement which the sprocket-wheel has independent of the hub is only such small fraction of a rotation as is necessary to force the lug $j'$ inward a distance equal to the width of the space normally between the split sleeve and the stationary member.

In place of a single integral split sleeve two or more sections of a sleeve might be used, the same being secured at their stationary ends to the hub. I have shown in Fig. 1 in dotted lines at S screws or rivets which might be used to secure the sleeve to the hub, though it will be understood that when the sleeve is a single integral member such screws or rivets would not ordinarily be used, the snug fit of the sleeve preventing its displacement. Such construction I mean to include by the term "sleeve" herein. Similarly a single sleeve with one slot $j$ or with three or more slots might be used and the number of lugs $j'$ might be changed.

In assembling the hub, as shown in the drawings, the split sleeve is first placed in the hub-barrel by being slipped into it, its free ends being compressed sufficiently for its lugs to slide into the interior of the barrel and the lugs springing into place through the holes $d'$ when they reach these holes. The sleeve being in place, the sprocket-wheel is slipped over the outside of the hub, the cup G, containing balls, held in place by a ball-retainer or other means, screwed into the end of the hub, a washer U' (prevented from turning by a lug $u'$ extending into a groove $d^3$ in the hub) is inserted, and the nut R screwed onto the outside of the hub until proper play is given to the sprocket-wheel, when the cup G' is turned back against the inward flange $r$ of the nut R, thereby locking both that nut and the cup in place. The axle is then placed within the hub and the cup G, including the balls held by its retainer or other means, is screwed into the other end of the hub. The bearings are then nicely adjusted by this cup G, a washer U, having a lug $u$ extending into a groove $d^2$ in the hub, is inserted, and the jam-nut T is screwed into the hub against this washer, thus locking the cup in place.

In operation my improved brake is as follows: During the forward movement of the bicycle the sprocket-wheel engages with the surface $j^2$ of the lugs and is thereby virtually rigidly connected with the hub D, which it drives forward as though no brake were present. When the rider back-pedals, however, the sprocket-wheel shifts backward on the hub, and thus forces the lugs inward and thereby causes the split sleeve to clasp the stationary member. The tightness of such clasp, and hence the degree of braking action, depends upon the force with which the rider back-pedals.

Having described my invention, I claim—

1. In a brake for a bicycle, or other vehicle, in combination, a sprocket or other driving wheel, a hub to be driven, a stationary braking member within the hub, a movable braking member within the hub and normally loosely surrounding the stationary member, said movable member revolving with the hub and adapted to be forced toward the axis of the hub and thus into contact with the stationary member, and coöperating engaging cam-surfaces on the movable braking member and driving-wheel, whereby the forward rotation of the driving-wheel revolves said revolving member without forcing it inward, and backward movement of the driving-wheel relative to the hub forces said revolving member inward and into contact with the stationary member, substantially as described.

2. In a brake for a bicycle or other vehicle, a hub to be driven, a sprocket or other driving wheel, a split sleeve, lugs thereon, a limited cam engagement between said lugs and wheel, whereby the forward movement of said wheel causes a forward circular movement of said lugs and a movement of said wheel rearward with respect to said hub causes an inward movement of said lugs, and a stationary member with which said sleeve is adapted to contact when said lugs are moved inward, substantially as described.

3. In a bicycle-brake, in combination, a hub to be driven, a split sleeve carried by the hub, lugs on said split sleeve projecting through slots in said hub, and by engaging with the walls of said slots locking said sleeve to said hub, a sprocket or other driving wheel carried by said hub and surrounding said lugs and having recesses which receive said lugs and engage therewith by a cam-surface, whereby when said driving-wheel is revolved forward it drives said lugs in a circular direction, but when revolved rearward relative to the hub it drives them inward, and a stationary member from which said sleeve is normally free but with which it is adapted to contact when said lugs are driven inward, substantially as described.

4. In a brake for a bicycle or other vehicle, in combination, a hub, a sleeve within the same, said sleeve being divided part way of its length by one or more slots extending from one end, whereby that end of the sleeve forms spring-arms which may be forced inward from their natural position, and the other end of the sleeve forms a rigid body, a stationary braking member within the sleeve, and means for forcing the spring-arms of the sleeve radially inward into contact with the stationary member, substantially as described.

5. A split sleeve for a brake, consisting of a substantially cylindrical body divided by a plurality of slots extending in a direction substantially parallel with the axis from one end, but stopping short of the other end, whereby said sleeve has a plurality of projecting spring-arms, each of said arms having a lug formed on it near its free end, substantially as described.

In testimony whereof I affix my signature in presence of two witnesses.

LOUIS E. HOFFMAN.

Witnesses:
E. B. GILCHRIST,
ALBERT H. BATES.